(12) United States Patent
O'Meallie et al.

(10) Patent No.: US 11,746,701 B2
(45) Date of Patent: Sep. 5, 2023

(54) BLEED EXPANDER COOLING WITH TURBINE

(71) Applicant: Rolls-Royce North American Technologies, Inc., Indianapolis, IN (US)

(72) Inventors: Paul O'Meallie, Brownsburg, IN (US); Douglas J. Snyder, Carmel, IN (US)

(73) Assignee: ROLLS-ROYCE NORTH AMERICAN TECHNOLOGIES, INC., Indianapolis, IN (US)

( * ) Notice: Subject to any disclaimer, the term of this patent is extended or adjusted under 35 U.S.C. 154(b) by 715 days.

(21) Appl. No.: 16/530,447

(22) Filed: Aug. 2, 2019

(65) Prior Publication Data

US 2020/0355121 A1 Nov. 12, 2020

Related U.S. Application Data

(60) Provisional application No. 62/716,841, filed on Aug. 9, 2018.

(51) Int. Cl.
| | |
|---|---|
| *F02C 7/277* | (2006.01) |
| *F02C 7/18* | (2006.01) |
| *F02C 9/18* | (2006.01) |
| *F02C 7/36* | (2006.01) |
| *F02C 3/06* | (2006.01) |
| *B64D 13/06* | (2006.01) |

(52) U.S. Cl.
CPC ............... *F02C 7/18* (2013.01); *F02C 3/062* (2013.01); *F02C 7/277* (2013.01); *F02C 7/36* (2013.01); *F02C 9/18* (2013.01); *B64D 2013/064* (2013.01); *F05D 2220/323* (2013.01); *F05D 2240/60* (2013.01); *F05D 2260/213* (2013.01); *F05D 2260/221* (2013.01); *F05D 2260/232* (2013.01)

(58) Field of Classification Search
CPC ........................ B64D 2013/064; F02C 7/277
See application file for complete search history.

(56) References Cited

U.S. PATENT DOCUMENTS

| 5,463,865 | A | * | 11/1995 | Smith ..................... F01D 17/08 |
| | | | | 415/118 |
| 5,701,755 | A | | 12/1997 | Severson et al. |
| 6,408,641 | B1 | | 6/2002 | Skur, III |
| 6,615,606 | B2 | | 9/2003 | Zywiak |

(Continued)

FOREIGN PATENT DOCUMENTS

WO 02076827 A1 10/2002

*Primary Examiner* — Todd E Manahan
*Assistant Examiner* — Marc J Amar
(74) *Attorney, Agent, or Firm* — Shumaker & Sieffert, P.A.

(57) ABSTRACT

An example thermal management system may include a first heat exchanger including a bleed air inlet configured to receive input bleed air from a gas turbine engine and a bleed air outlet configured to output cooled bleed air. A turbine including a turbine inlet may be fluidically coupled to the bleed air outlet. The turbine may be configured to drive a shaft mechanically coupled to the turbine in response to expansion of the cooled bleed air through the turbine. A second heat exchanger may include an expanded bleed air inlet fluidically coupled to a turbine outlet of the turbine. The second heat exchanger may be configured to extract heat from at least one heat source using the expanded bleed air.

19 Claims, 8 Drawing Sheets

(56) References Cited

U.S. PATENT DOCUMENTS

| | | | | |
|---|---|---|---|---|
| 7,584,600 | B2* | 9/2009 | Klingels | B64D 13/06 60/39.183 |
| 8,955,335 | B2* | 2/2015 | Burns | F02C 7/32 60/801 |
| 2006/0260323 | A1* | 11/2006 | Moulebhar | F02C 7/268 60/793 |
| 2009/0302152 | A1* | 12/2009 | Knight | F02C 7/20 60/39.15 |
| 2009/0314002 | A1* | 12/2009 | Libera | F02C 7/277 60/778 |
| 2010/0024434 | A1* | 2/2010 | Moore | F02C 7/32 290/46 |
| 2010/0314877 | A1* | 12/2010 | Finney | F01D 15/10 60/785 |
| 2012/0175080 | A1* | 7/2012 | Muehthaler | B64D 13/08 165/96 |
| 2015/0354464 | A1* | 12/2015 | Hillel | F04D 27/0261 415/144 |
| 2016/0010485 | A1* | 1/2016 | Volkmann | F01D 15/10 60/774 |
| 2016/0362999 | A1* | 12/2016 | Ho | F04D 29/321 |
| 2017/0327235 | A1* | 11/2017 | Feulner | F02C 7/277 |
| 2018/0080383 | A1* | 3/2018 | Snape | F02C 7/185 |
| 2019/0383220 | A1* | 12/2019 | Mackin | B64D 15/166 |
| 2020/0025073 | A1* | 1/2020 | Bemment | F02C 9/18 |

* cited by examiner

BLEED EXPANDER COOLING WITH TURBINE

This application claims the benefit of U.S. Provisional Application No. 62/716,841 filed Aug. 9, 2018, which is incorporated herein by reference in its entirety.

TECHNICAL FIELD

The present disclosure relates to thermal management systems for gas engine turbine powered vehicles, such as aircraft.

BACKGROUND

Electrical systems are increasingly used to replace mechanical, hydraulic, and pneumatic drive systems in gas turbine engine powered vehicles, such as aircraft. Gas turbine engine powered vehicles may use thermal management systems to control and reject thermal loads produced during electrical power generation, electrical power distribution, power conversion, or produced by operation of electric motors, power electronics, digital electronics, and environmental control systems.

SUMMARY

The present disclosure is directed to thermal management systems and techniques that provide improved cooling capacity and improved thermal performance for management of high heat load electrical systems. The thermal management systems and techniques disclosed herein may expand bleed air from a turbine engine with an air turbine engine starter or at least one dedicated turbine of the thermal management system. Expanding the bleed air may enable cooling the air below the temperature of the bleed air pulled from the turbine engine, resulting in cooled bleed air with a higher cooling capacity than unexpanded bleed air. The expanded bleed air may be used to cool a cooling fluid of the thermal management system. The cooling fluid may be used for cooling high heat load electronics. At least some of the energy lost by the air bleed may be reclaimed as, for example, shaft work that may be delivered back to the turbine engine. In this way, including the air turbine engine starter or a dedicated turbine based thermal management system may enable more fuel-efficient cooling at the vehicle level.

In some examples, the present disclosure is directed to a thermal management system including a first heat exchanger, an air starter turbine, and a second heat exchanger. The first heat exchanger includes a bleed air inlet configured to receive bleed air from a gas turbine engine and a bleed air outlet configured to output cooled bleed air from the first heat exchanger. The air starter turbine includes a turbine inlet fluidically coupled to the bleed air outlet of the first heat exchanger and a turbine outlet. The air starter turbine may be configured to drive a shaft mechanically coupled to the air starter turbine in response to expansion of the cooled bleed air through the air turbine starter. The second heat exchanger includes an expanded bleed air inlet fluidically coupled to the turbine outlet. The second heat exchanger may be configured to extract heat from at least one heat source using the expanded bleed air.

In some examples, the present disclosure is directed to a thermal management system including a first heat exchanger, a first turbine, a second heat exchanger, a second turbine, third heat exchanger, a first cooling fluid circuit, and a second cooling fluid circuit. The first heat exchanger includes a bleed air inlet configured to receive bleed air from a gas turbine engine and a bleed air outlet configured to output cooled bleed air from the first heat exchanger. The first turbine includes a turbine inlet fluidically coupled to the bleed air outlet of the first heat exchanger and a turbine outlet. The first turbine is configured to at least partially drive a shaft mechanically coupled to the first turbine in response to expansion of the cooled bleed air through the first turbine. The second heat exchanger includes an expanded bleed air input fluidically coupled to the turbine outlet. The second turbine may be fluidically coupled to an outlet of the second heat exchanger and mechanically coupled to the shaft. The second turbine may be configured to at least partially drive the shaft. The third heat exchanger may be fluidically coupled to an outlet of the second turbine. The second heat exchanger may be configured to extract heat from a first cooling fluid of the first cooling fluid circuit. The first cooling fluid circuit may be configured to distribute the first cooling fluid to a first heat source. The third heat exchanger may be configured to extract heat from a second cooling fluid of the second cooling fluid circuit. The second cooling fluid circuit may be configured to distribute the second cooling fluid to a second heat source to extract heat from the second heat source.

In some examples, the present disclosure is directed to a method of managing a thermal load of a vehicle system including cooling bleed air from a gas turbine engine with a first heat exchanger including a bleed air inlet configured to receive bleed air from a gas turbine engine and a bleed air outlet configured to output cooled bleed air from the first heat exchanger. The method also includes extracting work from the cooled bleed air with an air starter turbine including a turbine inlet fluidically coupled to the bleed air outlet of the first heat exchanger and a turbine outlet. The air starter turbine may be configured to drive a shaft mechanically coupled to the air starter turbine. In some examples, the air starter turbine may be mechanically coupled to an engine shaft. Extracting work from the cooled bleed air may further cool the cooled bleed air. The method also includes extracting heat from at least one heat source with a second heat exchanger including an expanded bleed air inlet fluidically coupled an outlet of the air starter turbine using the expanded bleed air.

The details of one or more examples are set forth in the accompanying drawings and the description below. Other features, objects, and advantages will be apparent from the description and drawings, and from the claims.

DETAILED DESCRIPTION

Figure 1:
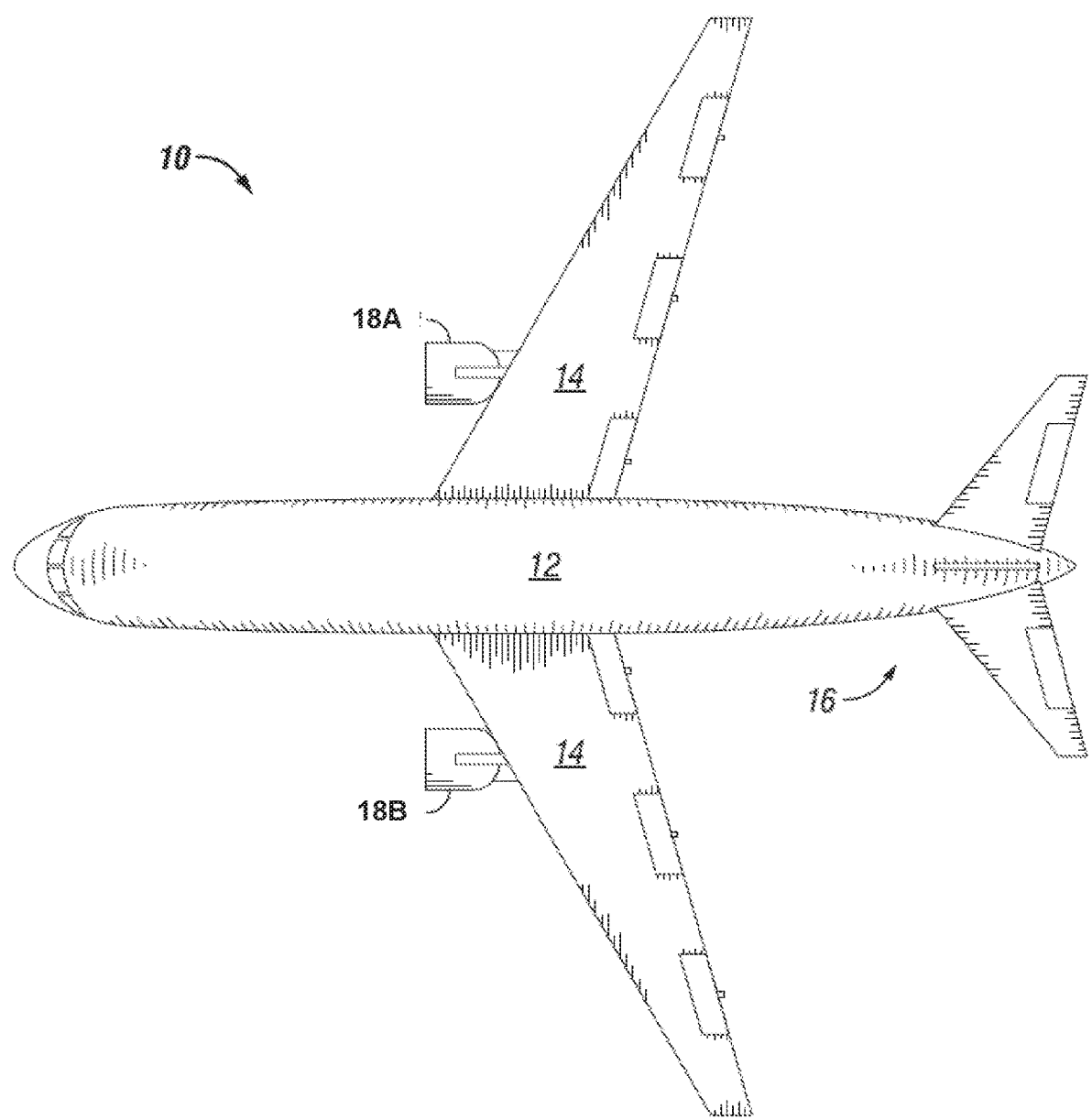
FIG. 1 is a conceptual diagram illustrating an example vehicle in accordance with an example of the present disclosure.

The present disclosure is directed to thermal management systems and techniques that provide improved cooling capacity and improved thermal performance for management of high heat load electrical systems. Typically, aviation platforms use fuel, ambient air, or both as heat sinks for ultimate rejection of heat. Rejection of heat to fuel may be limited by the volume of fuel, temperature of the heat load or the maximum allowable temperature of the fuel and may fluctuate during operation. For example, an aircraft electrical system may require cooling during idle-descent when electrical loads are relatively high (e.g., for actuation of flight control surfaces), but fuel flow may be relatively low, thus limiting heat rejection to the fuel. Rejection of heat to ambient air, though often abundantly available, may be affected by altitude or environmental conditions (e.g., air temperature), and use of ram air in flight induces drag and increases fuel consumption. Electric, more electric, turbo-electric, and hybrid electric aircraft include high heat load electrical systems, such as electrical power generation systems, electrical power distribution systems, and power conversion systems, electrical energy storage systems, as well as power electronics, digital electronics, and environmental control systems. Thermal management systems in aircraft including high heat load electrical systems manage relatively larger amounts of heat compared to aircraft without high heat load electrical systems. For example, high heat load electrical systems may utilize increased cooling capacity and cool components to temperatures that are lower than what is typically required on gas turbine propulsion systems. These lower temperatures may be difficult to achieve in some ambient environments, such as relatively warm climates at low altitudes or under forward flight with ram heating, or both.

In accordance with examples of this disclosure, to improve thermal management of high heat load electrical systems, the temperature of a thermal management system heat sink may be lowered, the cooling capacity of the thermal management system may be increased, or both. For example, high pressure bleed air from a low-pressure turbine engine compressor, and interstage-pressure turbine engine compressor, or a high-pressure turbine engine compressor, or any combination thereof may be expanded by an expander (e.g., a turbine) to cool the bleed air below the initial temperature of the bleed air. In some examples, the expander includes a turbine, such as an air starter turbine or a dedicated thermal management system turbine. Expanding the air with the turbine may enable some of the energy lost during the air bleed to be reclaimed and delivered back to the gas turbine engine. In examples in which the turbine is an air starter turbine, the air starter turbine is configured to operate across a greater range of rotational speeds and a greater range of air flow rates compared to air starter turbines that are configured to decouple from the engine at high speeds and flow air at large, substantially constant volumes. Cooled bleed air from the expander is directed to an air-to-liquid, air-to-vapor, air-to-two phase heat exchanger, or combinations thereof, to cool a cooling fluid. The cooling fluid may be used to cool high heat load electrical systems and power electronics systems of the vehicle. The thermal management system may be controlled to modulate the bleed airflow to provide cooling for the high heat load electrical systems while reducing effect on engine power caused by extracting engine bleed air. The thermal management system also may be controlled to protect the thermal management system from ice formation during bleed air expansion or improve system efficiency by taking a smaller bleed when less cooling is needed.

FIG. 1 is a conceptual diagram illustrating an example vehicle in accordance with an example of the present disclosure. In some examples, the vehicle includes an aircraft 10. In other examples, the vehicle may include any type of gas turbine engine-powered vehicle, including one or more types of air vehicles; land vehicles, including but not limited to, tracked and/or wheeled vehicles; marine vehicles, including but not limited to surface vessels, submarines, and/or semi-submersibles; amphibious vehicles; or any combination of one or more types of air, land, and marine vehicles. The vehicle may be manned, semiautonomous, or autonomous.

Aircraft 10 includes a fuselage 12, wings 14, an empennage 16, and two propulsion systems 18A and 18B (collectively, "propulsion systems 18"). In other examples, aircraft 10 may include a single propulsion system 18 or a plurality of propulsion systems 18. As illustrated in FIG. 1, aircraft 10 is a twin-engine turbofan aircraft. In some examples, aircraft 10 may be any fixed-wing aircraft, including turbofan aircraft, turbojet aircraft, and turboprop aircraft. In some examples, aircraft 10 may be a rotary-wing aircraft or a combination rotary-wing/fixed-wing aircraft. In addition to propulsion systems 18, aircraft 10 may include one or more gas turbine auxiliary power units (APUs). Aircraft 10 may employ any number of wings 14. Empennage 16 may employ a single or multiple flight control surfaces.

Figure 2:
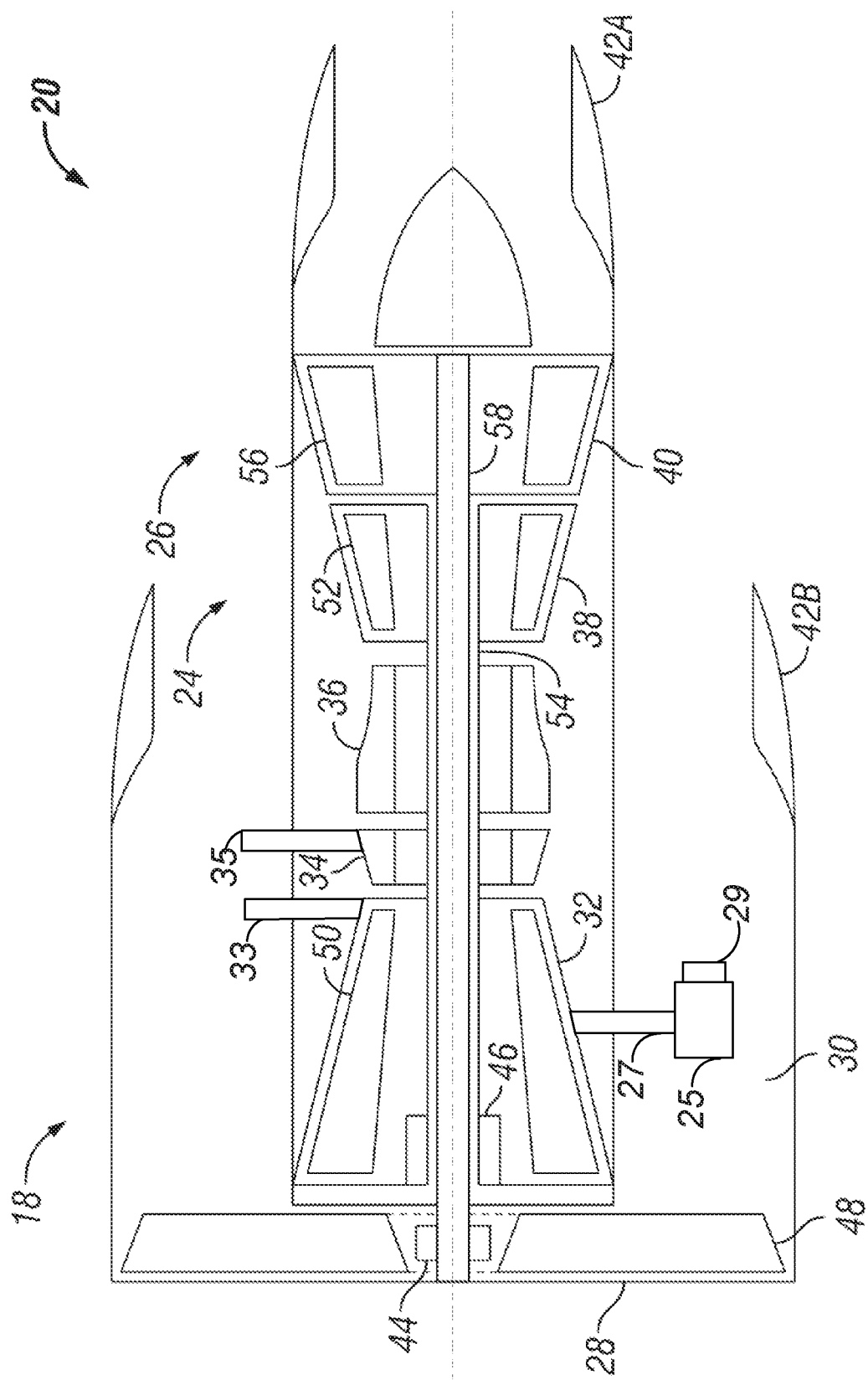
FIG. 2 is a conceptual and schematic diagram illustrating an example propulsion system in accordance with an example of the present disclosure.

In some examples, propulsion systems 18 may include gas turbine engines. FIG. 2 is a conceptual and schematic diagram illustrating an example propulsion system 18 of FIG. 1 in accordance with an example of the present disclosure. Propulsion system 18 includes a gas turbine engine 20 as a main engine, i.e., main propulsion engine. In some examples, propulsion system 18 may include an auxiliary power unit (not shown), such as, for example, a secondary gas turbine engine, a piston engine, a hybrid engine, or the like. Although described herein as with respect to an aircraft propulsion system, in other examples, propulsion system 18 may be a power system for providing propulsive thrust to any type of gas turbine engine powered vehicle, as discussed above, configured to provide power to a generator (e.g., located in fuselage 12), such as, in a distributed propulsion system, or configured to power any suitable nonvehicle system including gas turbine engine 20.

Engine 20 is a primary propulsion engine that provides thrust for flight operations of aircraft 10. In some examples, engine 20 is a two-spool engine having a high pressure (HP) spool 24 and a low pressure (LP) spool 26. In other examples, engine 20 may include three or more spools, e.g., may include an intermediate pressure (IP) spool and/or other spools. In some examples, engine 20 is a turbofan engine, wherein LP spool 26 is operative to drive a propulsor in the form of a turbofan (fan) system 28. In other examples, engine 20 may not include a LP spool or fan system 28. In some examples, engine 20 may include any suitable turbine powered-engine propulsion system, including but not limited to, a turbojet engine or a turboprop engine.

As illustrated in FIG. 2, engine 20 includes a fan system 28 in fluid communication with a bypass duct 30 and a compressor system 32. A diffuser 34 is in fluid communication with compressor system 32. A combustion system 36 is fluidically disposed between compressor system 32 and a high pressure (HP) turbine system 38 (e.g., disposed between compressor system 32 and HP turbine system 38 such that air or another fluid may flow from compressor system 32 to combustion system 36 to HP turbine system 38). In some examples, combustion system 36 includes a combustion liner (not shown) that encloses a continuous combustion process. In other examples, combustion system 36 may take other forms, and may be, for example, a wave rotor combustion system, a rotary valve combustion system, a pulse detonation combustion system, or a slinger combustion system, and may employ deflagration and/or detonation combustion processes. A low pressure (LP) turbine system 40 is fluidically disposed between HP turbine system 38 and a nozzle 42A configured to discharge a core flow of engine 20 (e.g., disposed between HP turbine system 38 and nozzle 42A such that air or another fluid may flow from HP turbine system 38 to LP turbine system 40 to nozzle 42A). A nozzle 42B is in fluid communication with bypass duct 30, and operative to transmit a bypass flow generated by fan system 28 around the core of engine 20. In other examples, other nozzle arrangements may be employed, e.g., a common nozzle for core and bypass flow; a nozzle for core flow, but no nozzle for bypass flow; or another nozzle arrangement.

Fan system 28 includes a fan rotor system 48 having one or more rotors (not shown) that are driven by LP spool 26 of LP turbine system 40. Fan system 28 may include one or more vanes (not shown). Compressor system 32 includes a compressor rotor system 50. In some examples, compressor rotor system 50 includes one or more rotors (not shown) that are powered by HP turbine system 38. High pressure turbine system 38 includes a first turbine rotor system 52. First turbine rotor system 52 includes one or more rotors (not shown) operative to drive compressor rotor system 50. First turbine rotor system 52 is drivingly coupled to compressor rotor system 50 via a shafting system 54. Low pressure turbine system 40 includes a second turbine rotor system 56. Second turbine rotor system 56 includes one or more rotors (not shown) operative to drive fan rotor system 48. Second turbine rotor system 56 is drivingly coupled to fan rotor system 48 via a shafting system 58. Shafting systems 54 and 58 include a plurality of shafts that may rotate at the same or different speeds and directions. In some examples, only a single shaft may be employed in one or both of shafting systems 54 and 58. Turbine system 40 is operative to discharge the engine 20 core flow to nozzle 42A.

In some examples, engine 20 includes an air starter turbine 25. Air starter turbine 25 includes an air inlet 29 to receive compressed air from, for example, a compressed air source located remote from aircraft 10, or bleed air from compressor system 32 (such as an interstage bleed from compressor system 32) or diffuser 34. Expansion of the compressed air with air starter turbine 25 may cause rotation of one or more compressor spools of air starter turbine 25. The compressor spools of air starter turbine 25 may be mechanically coupled to an accessory gearbox 27 to transfer shaft work from the compressor spools of air starter turbine 25 to accessory gearbox 27. Accessory gearbox 27 is mechanically coupled to engine 20, such as, for example, via compressor system 32, HP spool 24 or LP spool 26. Air starter turbine 25 is configured to be operably coupled to HP spool 24 and/or LP spool 26 during the normal operating rotational speeds of HP spool 24 and/or LP spool 26. Air starter turbine 25 also is configured to receive variable mass flow rates of compressed air, hot and/or pressurized bleed air, or both.

During normal operation of gas turbine engine 20, air is drawn into the inlet of fan system 28 and pressurized by fan rotor system 48. Some of the air pressurized by fan rotor system 48 is directed into compressor system 32 as core flow, and some of the pressurized air is directed into bypass duct 30 as bypass flow. Compressor system 32 further pressurizes the portion of the air received therein from fan system 28, which is then discharged into diffuser 34. Diffuser 34 reduces the velocity of the pressurized air, and directs the diffused core airflow into combustion system 36. In some examples, a portion of the pressurized air (e.g., bleed air) may be discharged from compressor system 32 via a compressor system bleed air outlet 33, diffuser 34 via a diffuser bleed air outlet 35, an interstage bleed, or combinations thereof. Compressor system bleed air outlet 33, diffuser bleed air outlet 35, or both may be fluidically coupled to a thermal management system of aircraft 10. Fuel is mixed with the pressurized air in combustion system 36, which is then combusted. The hot gases exiting combustion system 36 are directed into turbine systems 38 and 40, which extract energy in the form of mechanical shaft power to drive compressor system 32 and fan system 28 via respective shafting systems 54 and 58.

In some examples, engine 20 may include an electrical machine 44 coupled to LP spool 26, an electrical machine 46 coupled to HP spool 24, or both. Electrical machine 44 and electrical machine 46 may be configured to provide electrical power to aircraft 10 during flight operations, during ground operations, or both. In some examples, each of electrical machines 44 and 46 are configured to convert mechanical power to electrical power and to convert electrical power to mechanical power, e.g., as in a motor/generator. In some examples, one or both of electrical machines 44 and 46 may be configured to only convert mechanical power into electrical power, e.g., as in a generator. In some examples, one or both of electrical machines 44 and 46 may be configured to only convert electrical power into mechanical power, e.g., as in a motor. In some examples, aircraft 10 may include other electrical systems including, for example, one or more of high heat load electrical systems, electrical power distribution systems, power conversion systems, power electronics, digital electronics, and environmental control systems.

Figure 3:
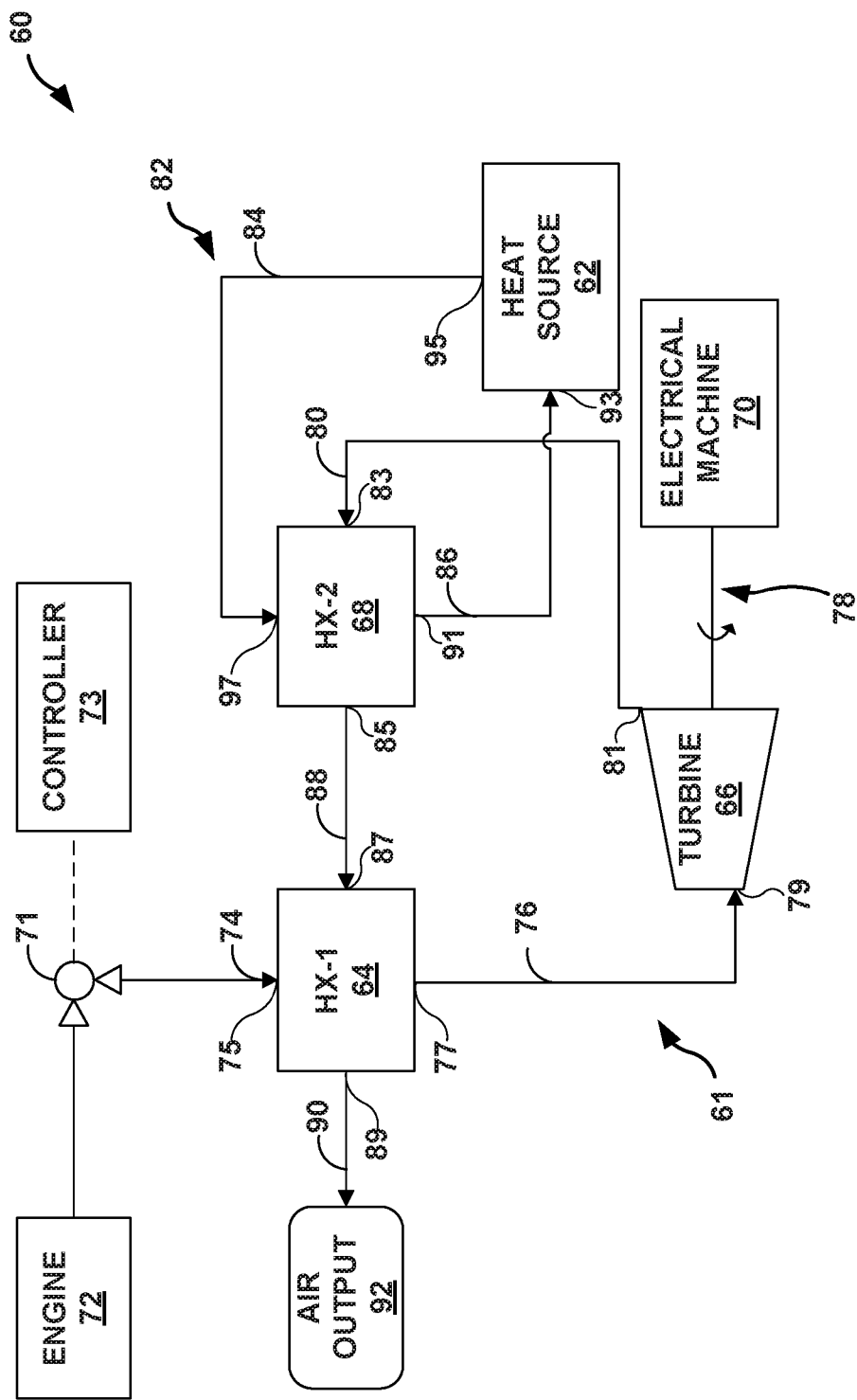
FIG. 3 is a conceptual and schematic diagram illustrating an example thermal management system having an air cycle system including a first heat exchanger, a turbine, and a second heat exchanger.

Aircraft 10 includes a thermal management system to extract heat from high heat load electrical systems, such as, for example, electrical machines 44 and 46, electrical power distribution systems, power conversion systems, power electronics, digital electronics, and environmental control systems. FIG. 3 is a conceptual and schematic diagram illustrating an example thermal management system 60 having an air cycle system 61 including a first heat exchanger (HX-1) 64, a turbine 66, and a second heat exchanger (HX-2) 68. Thermal management system 60 is configured to manage thermal loads of an at least one heat source 62 of aircraft 10. In some examples, heat source 62 includes one or more high heat load electrical systems, such as, for example, electrical machines 44 and 46, electrical power distribution systems, power conversion systems, power electronics, digital electronics, and environmental control systems. In some examples, an environmental control system may be configured to transfer the air from turbine 66 into an aircraft fuselage to provide aircraft cabin air cooling, in which case second heat exchanger 68 may be configured to exchange heat with components or people in the aircraft fuselage.

First heat exchanger 64 is configured to transfer heat from input bleed air 74 to heated, expanded bleed air 88. For example, first heat exchanger 64 may include an air-to-air heat exchanger. In other examples, first heat exchanger 64 may include an air-to-liquid heat exchanger, e.g., an air-fuel heat exchanger configured to transfer heat from input bleed air 74 to fuel of aircraft 10. First heat exchanger 64 includes a bleed air inlet 75 configured to receive input bleed air 74 from engine 72. In some examples, input bleed air 74 from engine 72 may include bleed air from compressor system bleed air outlet 33, diffuser bleed air outlet 35, an interstage bleed air outlet, or combinations thereof. In some examples, input bleed air 74 from engine 72 may include bleed air from an auxiliary power unit, for example, during ground operations of aircraft 10. A flow rate of input bleed air 74 may be controlled, e.g., via a valve 71 and a controller 73 configured to control an operation of valve 71, to regulate heat transfer in thermal management system 60. In some examples, a temperature of input bleed air 74 may be between about 200° C. and about 700° C.

First heat exchanger 64 includes a bleed air outlet 77 configured to output a cooled bleed air 76 from first heat exchanger 64 to turbine 66. Turbine 66 includes a turbine inlet 79 fluidically coupled to bleed air outlet 77 of first heat exchanger 64. In some examples, turbine 66 includes air starter turbine 25 discussed above in reference to FIG. 2. In other examples, turbine 66 may include any suitable turbine configured to receive cooled bleed air 76 from first heat exchanger 64 to expand cooled bleed air 76. Expansion of cooled bleed air 76 may be controlled, for example, during operation at low altitude or when a humidity of cooled bleed air 76 exceeds a threshold value, to reduce formation of ice in turbine 66, downstream of turbine 66, such as in second heat exchanger 68, or both.

Turbine 66 may extract work from the expansion of cooled bleed air 76. For example, turbine 66 may drive a shaft 78 mechanically coupled to turbine 66 in response to expansion of cooled bleed air 76 through turbine 66. In some examples, shaft 78 may be loaded against electrical machine 70. Electrical machine 70 may include a generator/motor or a generator. In some examples, electrical machine 70 may include one or both of electrical machines 44 and/or 46 discussed above in reference to FIG. 2. In other examples, shaft 78 may be loaded against a tower shaft mechanically coupled to engine 72, such as, for example, via accessory gearbox 27, a compressor, or another system configured to use shaft work. In some examples, the expansion of cooled bleed air 76 may be controlled to improve operation of components loaded against turbine 66.

Turbine 66 includes a turbine outlet 81 to output expanded bleed air 80. In some examples, a temperature of expanded bleed air 80 may be greater than the freezing point of water at the pressure of expanded bleed air 80. The turbine outlet of turbine 66 is fluidically coupled to an expanded bleed air inlet 83 of second heat exchanger 68.

Second heat exchanger 68 is configured to extract heat from heat source 62 using expanded bleed air 80 for use in cooling a heat source 62. For example, second heat exchanger 68 may be fluidically coupled to a cooling fluid circuit 82. Second heat exchanger 68 may include a cooling fluid inlet 97 configured to receive a hot cooling fluid 84 from a cooling fluid outlet 95 of heat source 62. Second heat exchanger 68 may facilitate the transfer of heat from hot cooling fluid 84 to expanded bleed air 80. Second heat exchanger 68 may include a cooling fluid outlet 91 fluidically coupled to cooling fluid inlet 93 of heat source 62 to deliver a cooled cooling fluid 86 to heat source 62. Cooled cooling fluid 86 may extract heat from heat source 62. In this way, cooling fluid circuit may extract heat from heat source 62.

The cooling fluid may include any suitable cooling fluid. A suitable cooling fluid may include single phase or two phase cooling fluid. In some examples, the cooling fluid may include one or more of propylene glycol, ethylene glycol, water, a heat transfer oil, 1,1,1,2-tetraflouroethene (R134A), or the like. The cooling fluid may be selected to undergo a first phase change (e.g., from liquid to vapor) when extracting heat from heat source 62 and a second phase change (e.g., from vapor to liquid) when transferring heat to expanded bleed air 80. For example, second heat exchanger 68 may include an air-cooled condenser configured to cause an at least partial phase change (e.g., condensation) of hot cooling fluid 84 including a vapor phase of the cooling fluid to output cooled cooling fluid 86 including a liquid phase of the cooling fluid. In some examples, cooling fluid circuit 82 may include a cooling fluid tank or accumulator configured to collect liquid phase cooling fluid, vapor phase cooling fluid, manage cooling fluid pressure, and/or manage cooling fluid thermal expansion. Cooling fluid circuit 82 also may include one or more pumps to move cooling fluid through cooling fluid circuit 82. In some examples, cooling fluid circuit 82 may include a refrigeration cycle system that may include, for example, a compressor, a tank, and an expansion valve.

Second heat exchanger 68 includes a heated, expanded bleed air outlet 85 configured to output heated, expanded bleed air 88 to heated, expanded bleed air inlet 87 of first heat exchanger 64. Heated, expanded bleed air 88 may be at a temperature that is less than inlet bleed air 74, such that first heat exchanger 64 may transfer heat from inlet bleed air 74 to heated, expanded bleed air 88. In this way, first heat exchanger 64 may utilize heat capacity of heated, expanded bleed air 88 to pre-cool inlet bleed air 74 prior to introduction of cooled bleed air 76 to turbine 66.

First heat exchanger 64 also includes a hot, expanded bleed air outlet 89 configured to output a hot, expanded bleed air 90 from first heat exchanger 64 to an air output 92. Air output 92 may include any suitable discharge for hot, expanded bleed air 90. In some examples, air output 92 may include bearing chambers of engine 72 configured to use hot, expanded bleed air 90 to buffer and/or cool the bearing chambers. In some examples, air output 92 may be used in a tip clearance control system of engine 72. Using hot, expanded bleed air 90 for tip clearance control systems may improve the fuel efficiency of engine 72. For example, tip clearance control systems may reduce an amount of combustion gases passing around the tips of one or more rotor systems of engine 72 to increase the amount of combustion gases driving rotation of the one or more rotor systems of engine 72. In some examples, hot, expanded bleed air 90 may be discharge to a low pressure station in the core stream of engine 72. Hot, expanded bleed air 90 may be recompressed prior to discharge into the core stream of engine 72 and in turn provide a load on the turbine 66. In some examples, hot, expanded bleed air 90 may be discharged outside aircraft 10, e.g., discharged overboard. Discharging hot, expanded bleed air 90 overboard may avoid the weight of additional systems to utilize hot, expanded bleed air 90.

Figure 4:
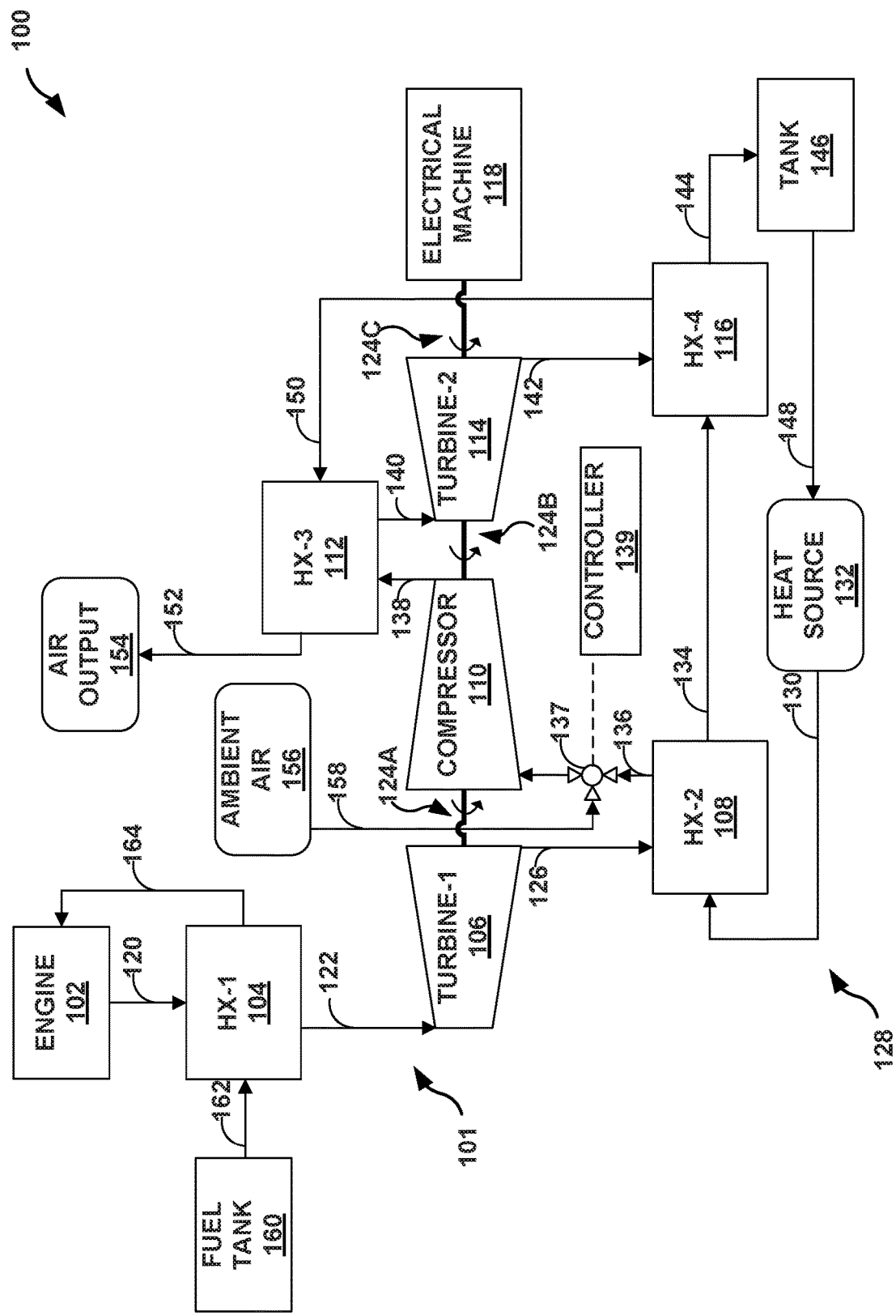
FIG. 4 is a conceptual and schematic diagram illustrating an example thermal management system having an air cycle system including a first heat exchanger, a first turbine, a second heat exchanger, a compressor, a third heat exchanger, a second turbine, and a fourth heat exchanger.

Thermal management system 60 may include additional components, such as, for example, one or more compressors, one or more additional turbines, and/or one or more additional heat exchangers to extract work from the bleed air and/or improve the thermal efficiency of the thermal management system 60. FIG. 4 is a conceptual and schematic diagram illustrating an example thermal management system 100 having an air cycle system 101 including a first heat exchanger 104, a first turbine 106, a second heat exchanger 108, a compressor 110, a third heat exchanger 112, a second turbine 114, and a fourth heat exchanger 116. Thermal management system 100 is configured to manage thermal loads of an at least one heat source 132 of aircraft 10. In some examples, heat source 132 includes one or more high heat load electrical systems, such as, for example, electrical machines 44 and 46, electrical power distribution systems, power conversion systems, power electronics, digital electronics, and environmental control systems.

First heat exchanger 104 is configured to extract heat from input bleed air 120 from engine 102. In some examples, first heat exchanger 104 includes an air-to-liquid heat exchanger configured to extract heat from input bleed air 120 to pre-heat fuel 162 from fuel tank 160. In some examples, first heat exchanger 104 may include an injector integrated heat exchanger, for example, as described in U.S. Patent Application 2017/0218845A1 by Snyder, which is incorporated herein by reference in its entirety. In some examples, one or more intermediate heat exchangers may pre-heat fuel 162 from fuel tank 160 prior to fuel 162 being heated in first heat exchanger 104. In some examples, fuel 162 may include a deoxygenated fuel. By using a deoxygenated fuel, fuel 162 may be heated to a higher temperature compared to other fuels, without causing coking issues in the fuel. Other fuel treatment options may be used to avoid coking of the fuel. In some examples, the one or more intermediate heat exchangers also may include one or more coatings or surface treatments to reduce clogging of the heat exchanger from fuel that has coked. Pre-heated fuel 164 may be output to engine 102. In other examples, first heat exchanger 104 includes an air-to-air heat exchanger, e.g., similar to first heat exchanger 64, discussed above in reference to FIG. 3. In some examples, first heat exchanger 104 includes a bleed air inlet (inlets not labeled in FIG. 4 for clarity) configured to receive input bleed air 120 from engine 102. Input bleed air 120 may be the same as or substantially similar to bleed air 74, discussed above in reference to FIG. 3. First heat exchanger 104 includes a bleed air outlet (outlets not labeled in FIG. 4 for clarity) configured to output cooled bleed air 122 from first heat exchanger 104 to first turbine 106. First heat exchanger 104 may also be cooled with other coolant sources, such as, for example, ram air or fan stream air.

First turbine 106 includes a turbine inlet fluidically coupled to the bleed air outlet of first heat exchanger 104. In some examples, first turbine 106 may be the same as or substantially similar to turbine 66 discussed above in reference to FIG. 3. For example, first turbine 106 may include an air starter turbine or a turbine dedicated to thermal management system 100. First turbine 106 may extract work from the expansion of cooled bleed air 122. For example, first turbine 106 may drive a first shaft 124A mechanically coupled to first turbine 106 in response to expansion of cooled bleed air 122 through turbine 106. First shaft 124A is loaded against compressor 110, electrical machine 118, or both. In other examples, first shaft 124A may be loaded against a tower shaft mechanically coupled to engine 102 or another system configured to use shaft work. In some examples, the expansion of cooled bleed air 122 may be controlled to improve operation of components loaded against first turbine 106.

First turbine 106 includes a turbine outlet to output an expanded bleed air 126. In some examples, a temperature of expanded bleed air 126 may be greater than a freezing point of water at the pressure of expanded bleed air 126. The turbine outlet of first turbine 106 is fluidically coupled to an expanded bleed air inlet of second heat exchanger 108.

Second heat exchanger 108 is configured to extract heat from a cooling fluid circuit 128. For example, second heat exchanger 108 may include a cooling fluid inlet configured to receive a hot cooling fluid 130 from heat source 132. Second heat exchanger 108 may facilitate the transfer of heat from hot cooling fluid 130 to expanded bleed air 126. Second heat exchanger 108 may include a cooling fluid outlet fluidically coupled to fourth heat exchanger 116 to deliver a cooled cooling fluid 134 to fourth heat exchanger 116. As discussed above in reference to FIG. 3, the cooling fluid may include any suitable cooling fluid, such as, for example, a cooling fluid selected to undergo a phase change. For example, second heat exchanger 108 may include an air-cooled condenser configured to cause an at least partial phase change (e.g., condensation) of hot cooling fluid 130 including a vapor phase of the cooling fluid to output cooled cooling fluid 134 including a liquid phase of the cooling fluid.

Second heat exchanger 108 includes a heated, expanded bleed air outlet configured to output heated, expanded bleed air 136. The heated, expanded bleed air outlet of second heat exchanger 108 may be fluidically coupled to compressor 110.

Compressor 110 is configured to compress heated, expanded bleed air 136. For example, first turbine 124 may drive compressor 110 via shaft 124 to increase the pressure and temperature of heated, expanded bleed air 136. Additionally, or alternatively, compressor 110 may be configured to be driven by electrical machine 118. Increasing the pressure of heated, expanded bleed air 136 with compressor 110 may improve heat rejection in third heat exchanger 112. Compressor 110 includes a compressor outlet to discharge recompressed bleed air 138. The compressor outlet of compressor 110 is fluidically coupled to a recompressed bleed air inlet of third heat exchanger 112.

Third heat exchanger 112 is configured to transfer heat from recompressed bleed air 138 to hot, expanded bleed air 150. For example, third heat exchanger 112 may include an air-to-air heat exchanger. Third heat exchanger 112 includes a cooled, recompressed bleed air outlet configured to output cooled, recompressed bleed air 140 from third heat exchanger 112 to second turbine 114.

Second turbine 114 includes a turbine inlet fluidically coupled to the cooled, recompressed bleed air outlet of third heat exchanger 112. In some examples, second turbine 114 may include air starter turbine 25. In some examples, second turbine 114 may include any suitable turbine configured to receive cooled, recompressed bleed air 140 from third heat exchanger 112 and extract work from cooled, recompressed bleed air 140 in response to expansion of cooled, recompressed bleed air 140 through second turbine 114. Second turbine 114 may extract work from the expansion of cooled, recompressed bleed air 140. For example, second turbine 114 may be mechanically coupled to shafts 124B and 124C. In some examples, shafts 124B and 124C may include shaft 124A. For example, shafts 124A, 124B, and 124C may define a common shaft mechanically coupling each of first turbine 106, compressor 110, and second turbine 114. In some examples, one or more gear boxes may be disposed between shafts 124A, 124B, and 124C such that shafts 124A, 124B, and 124C may be mechanically coupled and operate as different rotational speeds. In some examples, shaft 124C may be loaded against electrical machine 118. Electrical machine 118 may include a generator/motor or a generator. In some examples, electrical machine 118 may include electrical machines 44 and/or 46 discussed above in reference to FIG. 2. In some examples, electrical machine 118 may be electrically coupled to an electrical machine, e.g., electrical machines 44 and/or 46. In some examples, electrical machine 118 may be mechanically coupled to an electrical machine, e.g., electrical machines 44 and/or 46, via a tower shaft or any suitable mechanical coupling. In other examples, shaft 124C may be loaded against a tower shaft mechanically coupled to engine 102, a compressor, or any other system configured to use shaft work. In other examples, shafts 124A, 124B, and 124C may not be mechanically connected. For example, each of first turbine 106 and second turbine 114 may be loaded against separate components. In some examples, the expansion of cooled, recompressed bleed air 140 may be controlled to improve operation of components loaded against second turbine 114.

Second turbine 114 includes a turbine outlet to output an expanded bleed air 142. In some examples, second turbine 114 may fully expand cooled, recompressed bleed air 140, e.g., to ambient pressure. The turbine outlet of second turbine 114 is fluidically coupled to an expanded bleed air inlet of fourth heat exchanger 116.

Fourth heat exchanger 116 is configured to extract heat from cooling fluid circuit 128. For example, fourth heat exchanger 116 may include a cooling fluid inlet configured to receive cooled cooling fluid 134 from second heat exchanger 108. Fourth heat exchanger 116 may facilitate the transfer of heat from cooled cooling fluid 134 to expanded bleed air 142. In some examples, fourth heat exchanger 116 may include an air-cooled condenser configured to cause an at least partial phase change (e.g., condensation) of cooled cooling fluid 134 including a vapor phase of the cooling fluid to output cold cooling fluid 144 including a liquid phase of the cooling fluid. Fourth heat exchanger 116 includes a cooling fluid outlet. The cooling fluid outlet of fourth heat exchanger 116 may be fluidically coupled to cooling fluid tank 146. In some examples, cooling fluid tank 146 may include an accumulator, as discussed above in reference to FIG. 3. Cooling fluid tank 146 may collect liquid phase cooling fluid, vapor phase cooling fluid, or both. In some examples, cooling fluid tank 146 may separate liquid phase cooling fluid from vapor phase cooling fluid. Cooling fluid tank 146 may be fluidically coupled to a cooling fluid manifold 148. Cooling fluid manifold 148 may be fluidically coupled to heat source 132. In examples in which heat source 132 include a plurality of heat sources, cooling fluid manifold may divide and/or control a flow of cooling fluid to each respective heat source of the plurality of heat sources. In some examples, cooling fluid manifold may include one or more pumps to circulate the cooling fluid in cooling fluid circuit 128 to extract heat from heat source 132. In this way, cooling fluid circuit 128 may use the cooling fluid to transfer heat from heat source 132 to the bleed air in air cycle system 101. By using both second heat exchanger 108 and fourth heat exchanger 116, thermal management system 100 may extract more work from the expansion of input bleed air 120 to improve cooling capacity of thermal management system 100 and reduce ice formation downstream of first turbine 106 and second turbine 114 compared to other thermal management systems without second heat exchanger 108, fourth heat exchanger 116, first turbine 106, and second turbine 114.

Fourth heat exchanger 116 includes a heated, expanded bleed air outlet configured to output heated, expanded bleed air 150. The heated, expanded bleed air outlet of fourth heat exchanger 116 may be fluidically coupled to a heated, expanded bleed air inlet of third heat exchanger 112.

Heated, expanded bleed air 150 may include a temperature that is less than hot, recompressed bleed air 138, such that third heat exchanger 112 may transfer heat from hot, recompressed bleed air 138 to heated, expanded bleed air 150. Third heat exchanger 112 also includes a hot, expanded bleed air outlet configured to output hot, expanded bleed air 152 from third heat exchanger 112 to an air output 154. Air output 154 may be the same as or substantially similar to air output 92 discussed above in reference to FIG. 3.

In some examples, thermal management system 100 may be used without input bleed air 120. For example, input bleed air 120 may be unavailable during ground operations when engine 102 is offline. In examples in which the flow of input bleed air 120 is unavailable, electrical machine 118 may be used to drive compressor 110. Electrical machine 118 may be powered by, for example, one or more onboard batteries, one or more auxiliary power units, or other electrical power sources. When driven by electrical machine 118, compressor 110 may draw ambient air 158 from an ambient air source 156, e.g., air from outside aircraft 10. The lines supplying ambient air 158 and heated, expanded bleed air 136 to compressor 110 may be configured to selectively supply compressor 110. For example, one or more valves 137 and a controller 139 configured to control an operation of the one or more valve 137 may control flow of ambient air 158 and heated, expanded bleed air 136 to compressor 110. In this way, thermal management system 100 may cool heat source 132 without operating engine 102. The ability to cool heat source 132 without operating engine 102 may allow operation of onboard systems, such as high heat load electrical systems, when the aircraft is on the ground for maintenance or system checkout.

Figure 5:
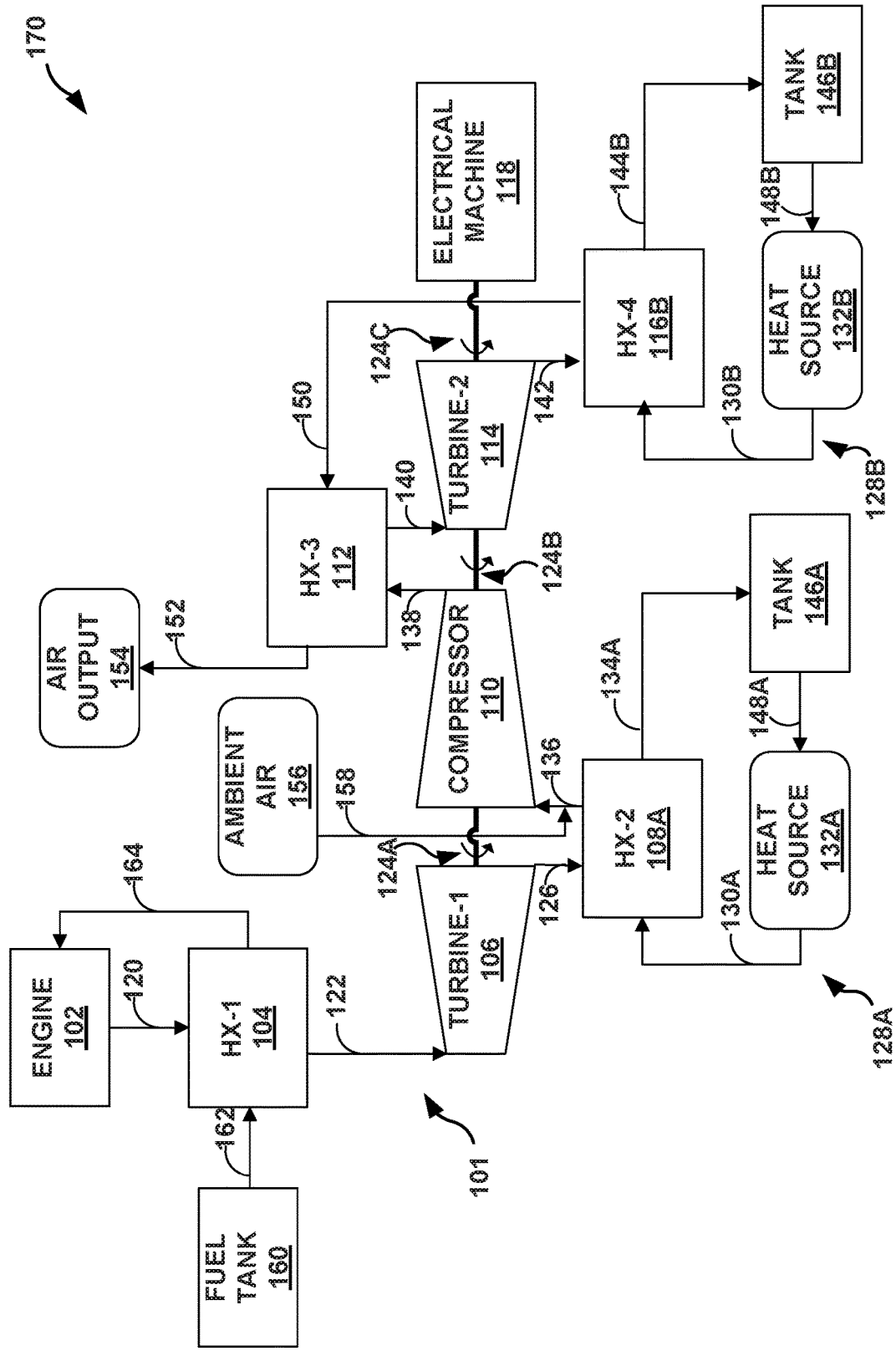
FIG. 5 is a conceptual and schematic diagram illustrating an example thermal management system including a first cooling fluid circuit and a second cooling fluid circuit.

In some examples, a thermal management system may include a plurality of cooling fluid circuits. FIG. 5 is a conceptual and schematic diagram illustrating the example thermal management system 170 including a first cooling fluid circuit 128A and a second cooling fluid circuit 128B. Thermal management system 170 is the same as or substantially similar to thermal management system 100 illustrated in FIG. 4, except for the differences described herein. For example, rather than a single cooling fluid circuit 128, thermal management system 170 includes second heat exchanger 108A configured to extract heat from first cooling fluid circuit 128A and fourth heat exchanger 116B is configured to extract heat from second cooling fluid circuit 128B.

Second heat exchanger 108A may include a cooling fluid inlet (inlets not labeled in FIG. 5 for clarity) configured to receive a hot cooling fluid 130A from heat source 132A. As discussed above in reference to FIG. 3, the cooling fluid may include any suitable cooling fluid. Second heat exchanger 108A may facilitate the transfer of heat from hot cooling fluid 130A to expanded bleed air 126. Second heat exchanger 108A may include a cooling fluid outlet (outlets not labeled in FIG. 5 for clarity) fluidically coupled to cooling fluid tank 146A to deliver a cooled cooling fluid 134A to cooling fluid tank 146A. Cooling fluid tank 146A may collect liquid phase cooling fluid, vapor phase cooling fluid, or both. In some examples, cooling fluid tank 146A may separate liquid phase cooling fluid from vapor phase cooling fluid. Cooling fluid tank 146A may be fluidically coupled to a cooling fluid manifold 148A. Cooling fluid manifold 148A may be fluidically coupled to a first heat source 132A. In some examples, cooling fluid manifold 148A may include one or more pumps to circulate the cooling fluid in cooling fluid circuit 128A to extract heat from first heat source 132A. In this way, cooling fluid circuit 128A may use the cooling fluid to transfer heat from first heat source 132A to the bleed air in air cycle system 101.

Fourth heat exchanger 116B may include a cooling fluid inlet configured to receive a hot cooling fluid 130B from heat source 132B. As discussed above in reference to FIG. 3, the cooling fluid may include any suitable cooling fluid. The cooling fluid in cooling fluid circuit 128B may be substantially the same as or different than the cooling fluid in cooling fluid circuit 128A. For example, the cooling fluid in each of first cooling fluid circuit 128A and second cooling fluid circuit 128B may be selected based on desired operating temperature or thermal capacity of the cooling fluid. Fourth heat exchanger 116B may facilitate the transfer of heat from hot cooling fluid 130B to expanded bleed air 142. Fourth heat exchanger 116B may include a cooling fluid outlet fluidically coupled to cooling fluid tank 146B to deliver a cooled cooling fluid 144B to cooling fluid tank 146B. Cooling fluid tank 146B may collect liquid phase cooling fluid, vapor phase cooling fluid, or both. In some examples, cooling fluid tank 146B may separate liquid phase cooling fluid from vapor phase cooling fluid. Cooling fluid tank 146B may be fluidically coupled to a cooling fluid manifold 148B. Cooling fluid manifold 148B may be fluidically coupled to a second heat source 132B. In some examples, cooling fluid manifold 148B may include one or more pumps to circulate the cooling fluid in cooling fluid circuit 128B to extract heat from second heat source 132B. In this way, cooling fluid circuit 128B may use the cooling fluid to transfer heat from second heat source 132B to the bleed air in air cycle system 101.

In some examples, first heat source 132A and second heat source 132B may include similar heat sources, such as, for example, electrical machines or power electronics. In other examples, each of first heat source 132A and second heat source 132B may include dissimilar heat sources. In some examples, first heat source 132A may include one or more high heat load electronics, such as electrical machines, and second heat source 132B may include power electronics. Each respective cooling fluid circuit 128A and 128B of thermal management system 170 may be configured to improve the thermal management of a respective thermal load of each respective heat source 132A and 132B. For example, first cooling fluid circuit 128A may include a greater cooling capacity, e.g., compared to second cooling fluid circuit 128B. The relatively greater thermal capacity may enable first cooling fluid circuit 128A to manage the heat load of the one or more high heat load electronics that require a greater cooling capacity compared to the power electronics. Second cooling fluid circuit 128B may achieve a lower temperature of cooled cooling fluid 144B compared to cooled cooling fluid 134A. For example, second cooling fluid circuit 128B may include less cooling fluid by volume compared to first cooling fluid circuit 128A such that fourth heat exchanger 116B may lower the temperature of cooled cooling fluid 144B more relative to cooled cooling fluid 134A. The relatively colder cooled cooling fluid 144B may be used to cool the power electronics to a selected operating temperature that is less than the temperature of the cooled cooling fluid 134A. In this way, thermal management system 170 may match coolant loop temperatures and cooling demands with turbine exit temperatures to improve the efficiency of thermal management system 170. Additionally or alternatively, each of first cooling circuit 128A and second cooling circuit 128B may use a cooling fluid selected to improve the efficiency or reliability of the respective cooling circuit. First cooling fluid circuit 132A and second cooling fluid circuit 132B may include other arrangements to improve the thermal management of other heat sources. Additionally, thermal management system 100 may include more than two cooling fluid circuits, such as more than ten cooling fluid circuits. By including a plurality of cooling fluid circuits, each respective cooling fluid circuit of thermal management system 100 may be configured to improve the thermal management of the thermal load of each respective heat source of a plurality of heat sources.

Figure 6:
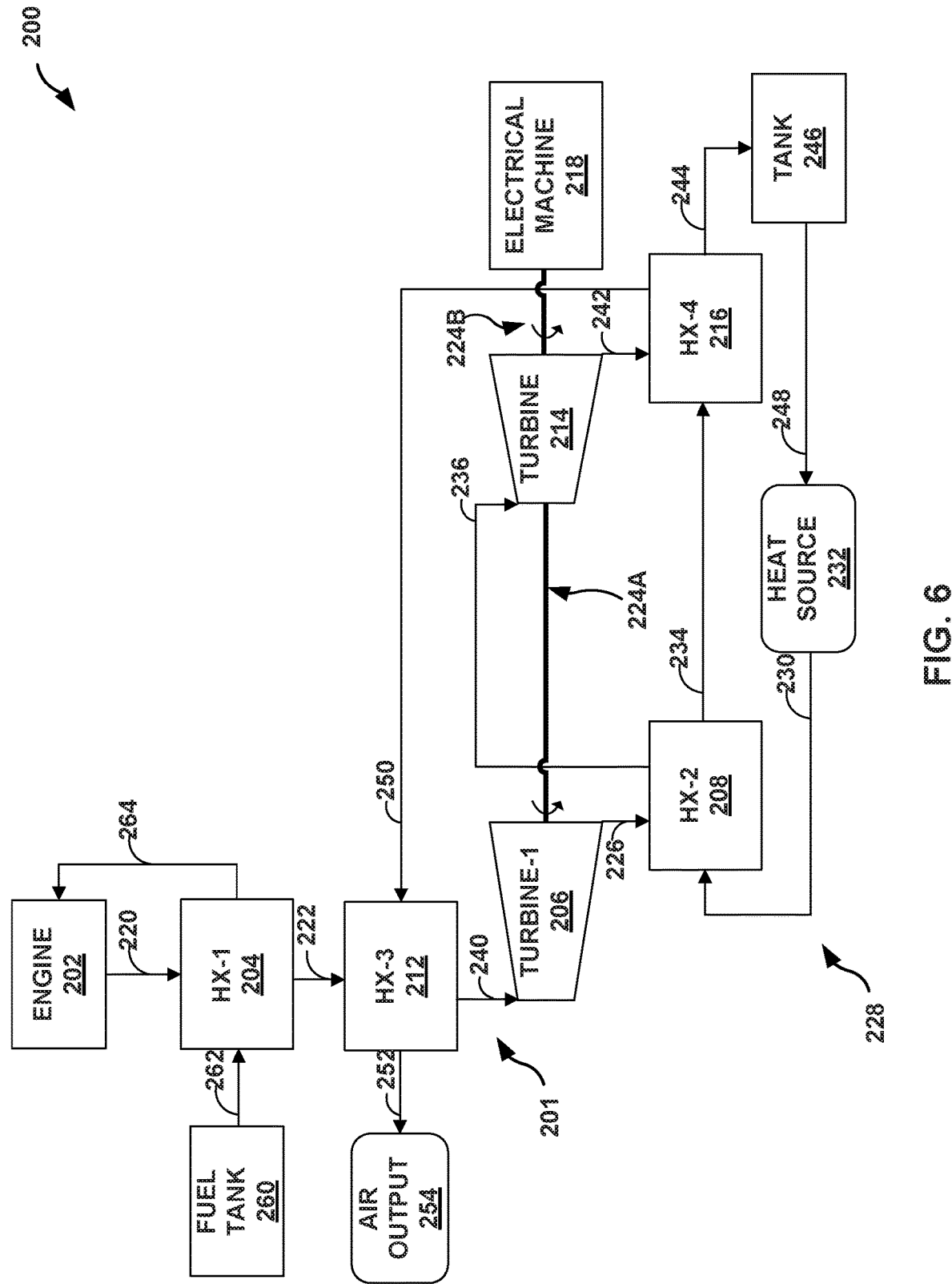
FIG. 6 is a conceptual and schematic diagram illustrating an example thermal management system having an air cycle system including a first heat exchanger, a third heat exchanger, a first turbine, a second heat exchanger, a second turbine, and a fourth heat exchanger.

In some examples, a thermal management system may include two or more turbines without a compressor to utilize the pressure of the bleed air. FIG. 6 is a conceptual and schematic diagram illustrating an example thermal management system 200 having an air cycle system 201 including a first heat exchanger 204, a third heat exchanger 212, a first turbine 206, a second heat exchanger 208, a second turbine 214, and a fourth heat exchanger 216. Thermal management system 200 is configured to manage thermal loads of heat source 232 of aircraft 10. In some examples, heat source 232 includes one or more high heat load electrical systems, such as, for example, electrical machines 44 and 46, electrical power distribution systems, power conversion systems, power electronics, digital electronics, and environmental control systems. Compared to thermal management systems 60 and 100, thermal management system 170 may utilize the full expansion of bleed air through the combination of the first turbine 206 and second turbine 214, while avoiding ice formation downstream of the turbines and without added mechanics or weight of a compressor, to manage heat loads of heat source 232.

First heat exchanger 204 may be the same as or substantially similar to first heat exchanger 104 discussed above in reference to FIG. 4. For example, first heat exchanger 204 includes a bleed air inlet (inlets not labeled in FIG. 6 for clarity) configured to receive input bleed air 220 from engine 202 and a bleed air outlet (outlets not labeled in FIG. 6 for clarity) configured to output cooled bleed air 222 to a cooled, compressed bleed air inlet of third heat exchanger 212. First heat exchanger 204 is configured to extract heat from input bleed air 220. Input bleed air 220 and cooled bleed air 222 may be the same as or substantially similar to bleed air 74, discussed above in reference to FIG. 3, and cooled bleed air 122, discussed above in reference to FIG. 4, respectively. In some examples, first heat exchanger includes an air-to-liquid heat exchanger configured to extract heat from input bleed air 220 to pre-heat fuel 262 (e.g., a deoxygenated fuel, as discussed above) from fuel tank 260 (or one or more intermediate fuel heat exchangers). Pre-heated fuel 264 may be output to engine 202, returned to fuel tank 260, or further heated by additional heat exchangers.

Third heat exchanger 212 is configured to transfer heat from cooled bleed air 222 to heated, expanded bleed air 250. For example, third heat exchanger 212 may include an air-to-air heat exchanger. Third heat exchanger 212 includes a cold bleed air outlet configured to output cold bleed air 240 from third heat exchanger 212 to turbine 206.

First turbine 206 includes a turbine inlet fluidically coupled to the cold bleed air outlet of third heat exchanger 212. In some examples, first turbine 206 may be the same as or substantially similar to turbine 106 discussed above in reference to FIG. 4. Turbine 206 may extract work from the expansion of cold bleed air 240. For example, turbine 206 may drive a first shaft 224A mechanically coupled to turbine 206 in response to expansion of cold bleed air 240 through first turbine 206. In some examples, first shaft 224A may be loaded against electrical machine 218. In other examples, first shaft 224A may be loaded against a tower shaft mechanically coupled to engine 202 or any other system configured to use shaft work.

Turbine 206 includes a turbine outlet to output an expanded bleed air 226. The turbine outlet of first turbine 206 is fluidically coupled to an expanded bleed air inlet of second heat exchanger 208.

Second heat exchanger 208 is configured to extract heat from a cooling fluid circuit 228. For example, second heat exchanger 208 may include a cooling fluid inlet configured to receive a hot cooling fluid 230 from heat source 232. Second heat exchanger 208 may facilitate the transfer of heat from hot cooling fluid 230 to expanded bleed air 226. Second heat exchanger 208 may include a cooling fluid outlet fluidically coupled to fourth heat exchanger 216 to deliver a cooled cooling fluid 234 to fourth heat exchanger 216. As discussed above in reference to FIG. 3, the cooling fluid may include any suitable cooling fluid, such as, for example, a cooling fluid selected to undergo a phase change. For example, second heat exchanger 208 may include an air-cooled condenser configured to cause an at least partial phase change (e.g., condensation) of hot cooling fluid 230 including a vapor phase of the cooling fluid to output cooled cooling fluid 234 including a liquid phase of the cooling fluid.

Second heat exchanger 208 includes a heated, expanded bleed air outlet configured to output heated, expanded bleed air 226. The heated, expanded bleed air outlet of second heat exchanger 208 may be fluidically coupled to a turbine inlet of second turbine 214.

Second turbine 214 may include any suitable turbine configured to receive heated, expanded bleed air 236 from second heat exchanger 208 and extract work from heated, expanded bleed air 236 in response to expansion of heated, expanded bleed air 236 through second turbine 214. Expansion of heated, expanded bleed air 236 may be limited, such as, for example, during operation at low altitude, when the humidity of heated, expanded bleed air 236 exceeds a threshold value. Second turbine 214 may be mechanically coupled to first shafts 224A and second shaft 224B. In some examples, first and second shafts 224A and 224B may define a common shaft mechanically coupling each of first turbine 206, second turbine 214, and electrical machine 218. In some examples, one or more gear boxes may be disposed between first and second shafts 224A and 224B such that each of first turbine 206, second turbine 214, and electrical machine 218 may be mechanically coupled and operate as different rotational speeds. In some examples, second shaft 224B is loaded against electrical machine 218. Electrical machine 218 may be the same as or substantially similar to electrical machine 118 discussed above in reference to FIG. 4. In other examples, second shaft 224B may be loaded against a tower shaft mechanically coupled to engine 202 or any other system configured to use shaft work. In some examples, first and second shafts 224A and 224B may not be mechanically connected. For example, each of first turbine 206 and second turbine 214 may be loaded against separate components. In some examples, the expansion of heated, expanded bleed air 236 may be controlled to improve operation of components loaded against second turbine 214.

Second turbine 214 includes a turbine outlet to output an expanded bleed air 242. The turbine outlet of second turbine 214 is fluidically coupled to an expanded bleed air inlet of fourth heat exchanger 216.

Fourth heat exchanger 216 is configured to extract heat from cooling fluid circuit 228. For example, fourth heat exchanger 216 may include a cooling fluid inlet configured to receive a cooled cooling fluid 234 from second heat exchanger 208. Fourth heat exchanger 216 may facilitate the transfer of heat from cooled cooling fluid 234 to expanded bleed air 242. In some examples, fourth heat exchanger 216 may include an air-cooled condenser configured to cause an at least partial phase change (e.g., condensation) of cooled cooling fluid 234 including a vapor phase of the cooling fluid to output cold cooling fluid 244 including a liquid phase of the cooling fluid. Fourth heat exchanger 216 includes a cooling fluid outlet. The cooling fluid outlet of fourth heat exchanger 216 may be fluidically coupled to cooling fluid collection tank 246. Cooling fluid collection tank 246 may be fluidically coupled to a cooling fluid manifold 248. Cooling fluid manifold 248 may be fluidically coupled to heat source 232. In some examples, cooling fluid manifold may include one or more pumps to circulate the cooling fluid in cooling fluid circuit 228 to extract heat from heat source 232. In this way, cooling fluid circuit 228 may use the cooling fluid to transfer heat from heat source 232 to the bleed air in air cycle system 201.

Fourth heat exchanger 216 includes a heated, expanded bleed air outlet configured to output heated, expanded bleed air 250. The heated, expanded bleed air outlet of fourth heat exchanger 216 may be fluidically coupled to a heated, expanded bleed air inlet of third heat exchanger 212.

Third heat exchanger 212 is configured to transfer heat from cooled bleed air 222 to heated, expanded bleed air 250. For example, third heat exchanger 212 may include an air-to-air heat exchanger. Third heat exchanger 212 includes a hot, expanded bleed air outlet configured to output hot, expanded bleed air 252 from third heat exchanger 212 to air output 254. Air output 254 may be the same as or substantially similar to air output 154 discussed above in reference to FIG. 4.

Figure 7:
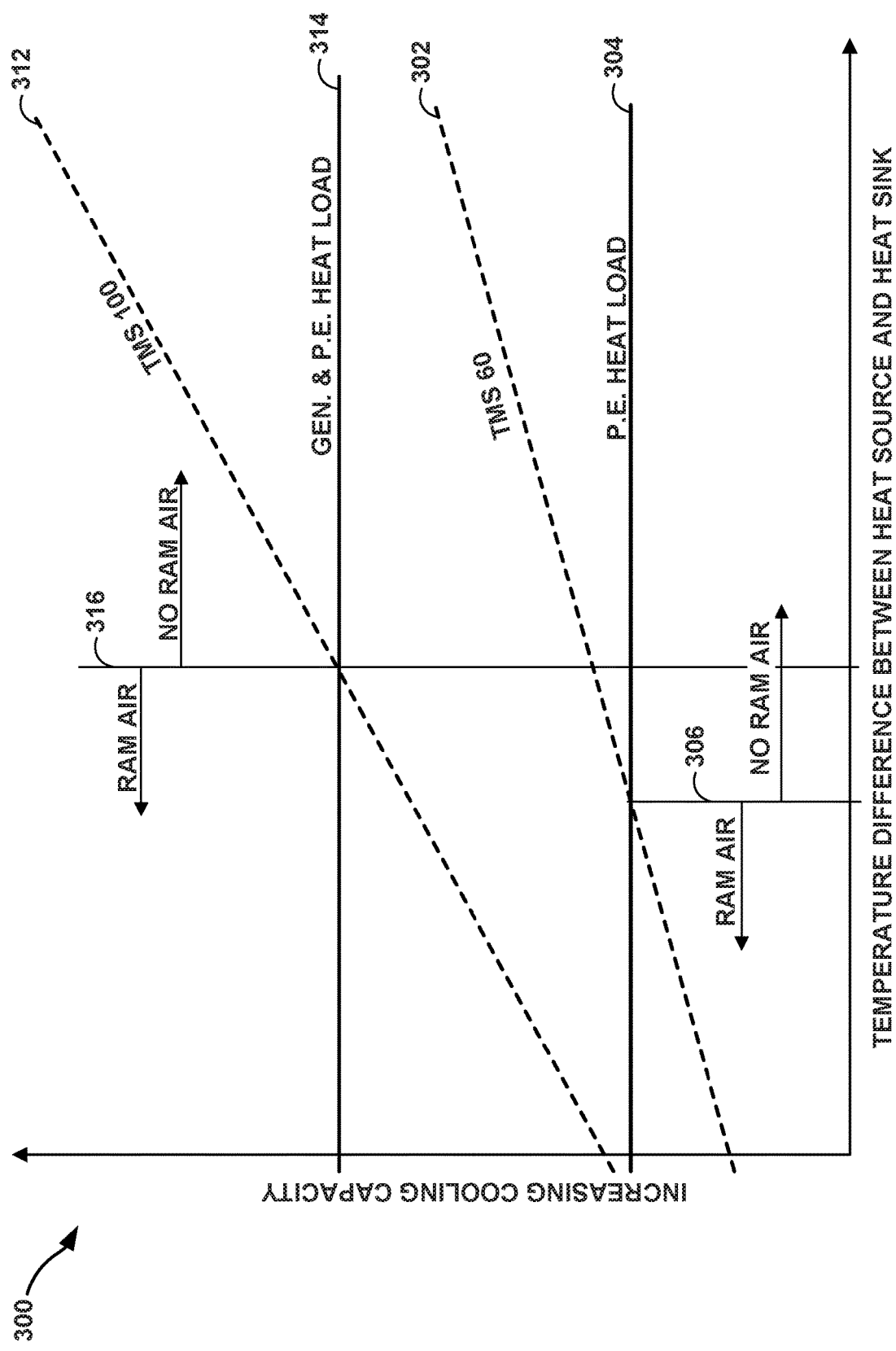
FIG. 7 is a plot illustrating cooling capacity versus temperature difference between the heat source and the heat sink for a thermal management system.

In some examples, the thermal management systems described herein may enable lower heat sink temperatures. This can result in colder cooling fluid temperatures, increased cooling capacity (e.g., increased cooling fluid thermal capacity due a greater temperature rise on the air heat sink), decreased air heat sink flow rate, or combinations thereof, compared to other thermal management systems. Reduced air heat sink flow rate can reduce ram air intake and therefore decrease ram drag. FIG. 7 is a plot 300 illustrating cooling capacity versus temperature difference between the heat source and the heat sink for thermal management system 60 and thermal management system 100. As illustrated in plot 300, thermal management system 60 (TMS 60) and thermal management system 100 (TMS 100), as described above in reference to FIGS. 4 and 5, respectively, have a cooling capacity that is associated with the temperature difference between the cooling fluid temperature and the air heat sink temperature of the thermal management system. For example, line 302 illustrates that the cooling capacity of thermal management system 60 increases with decreasing air heat sink temperature. Similarly, line 312 illustrates that the cooling capacity of thermal management system 100 increases with decreasing air heat sink temperature.

Thermal management systems 60 and 100 may manage or fully cool a heat source when the cooling capacity of the respective thermal management system is greater than or equal to the heat load from the heat source. For example, line 304 illustrates a constant heat load from a power electronics system of aircraft 10. Similarly, line 314 illustrates a constant heat load from a substantially steady state operation of electrical machines in addition to a constant heat load power electronics system of aircraft 10. The intersection of line 302 and line 304 illustrates when thermal management system 60 is able to manage the constant heat load from power electronics. For example, when the temperature difference between the heat source (coolant) and heat sink (cooled bleed air) is less than the value indicated by line 306 (to the left of line 306), a supplemental cooling system is required to manage the constant heat load, such as, for example, ram air intake for a ram air cooling system. However, when thermal management system 60 is able to increase the temperature difference between the heat source and heat sink (to the right) of the temperature indicated by line 306, then no ram air is needed. Because thermal management system 60 uses turbine 66 to expand the bleed air, and therefore reduce the temperature of the air heat sink, thermal management system 60 is able to increase the temperature difference between the heat source (coolant) and the heat sink (cooled bleed air) thereby increasing the temperature above line 306, to reduce or eliminate the need for supplemental cooling, such as ram air cooling.

Also, as illustrated in plot 300, thermal management system 60 may have insufficient cooling capacity over the range of temperature differences illustrated to manage the heat load from a substantially steady state operation of electrical machines in addition to a constant heat load power electronics, as indicated by line 314. However, thermal management system 100 may have sufficient cooling capacity to manage the heat load indicated by line 314. The intersection of line 312 and line 314 illustrates when thermal management system 100 is able to manage the constant heat load from a substantially steady state operation of electrical machines in addition to a constant heat load power electronics. For example, when the temperature difference is less than the value indicated by line 316, a supplemental cooling system is required to manage the constant heat load 314, such as, for example, ram air intake for a ram air cooling system. However, when thermal management system 100 is able to increase the temperature difference above the line indicated by line 316, then no ram air is needed. Because thermal management system 100 uses turbines 106 and 114 to expand the bleed air, thermal management system 100 can increase the temperature difference above the value indicated by line 316 to reduce the need to supplemental cooling, such as ram air cooling.

Figure 8:
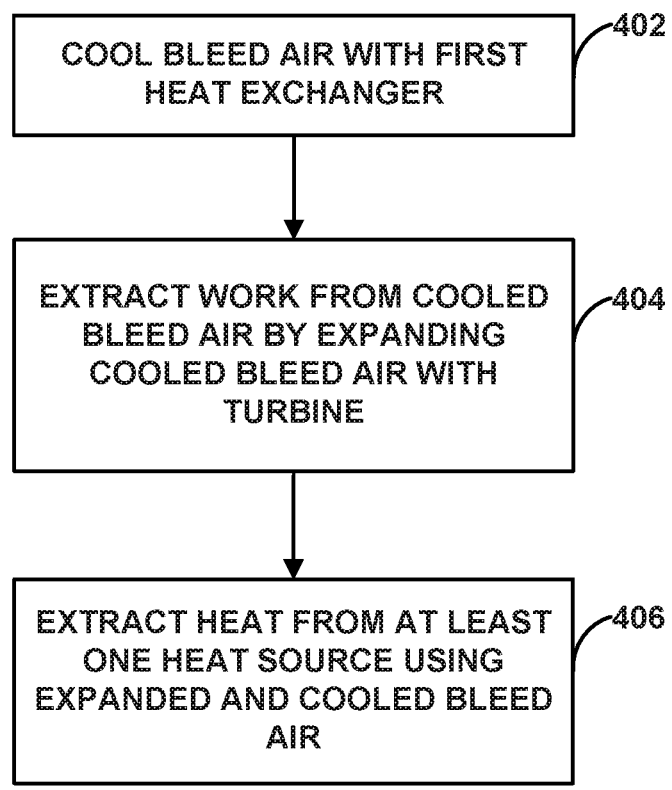
FIG. 8 is a flow diagram illustrating an example technique of managing a thermal load of a vehicle system.

The thermal management systems describe herein may be used to manage a thermal load of a vehicle system using any suitable technique. FIG. 8 is a flow diagram illustrating an example technique of managing a thermal load of a vehicle system. The technique illustrated in FIG. 8 is described with reference to thermal management systems 60, 100, 170, and 200, although a person of ordinary skill in the art will appreciate that similar techniques may be used to manage a thermal load of a vehicle system.

The technique illustrated in FIG. 8 includes cooling input bleed air 74 from engine 72 with first heat exchanger 64 (402). As discussed above in reference to FIG. 3, first heat exchanger 64 includes a bleed air inlet configured to receive input bleed air 74 from engine 72 and a bleed air outlet configured to output cooled bleed air 76 from first heat exchanger 64. In some examples, engine 72 includes a gas turbine engine. In some examples, cooling input bleed air 74 may include cooling input bleed air 74 with heated, expanded bleed air 88. In some examples, cooling input bleed air 74 may include cooling input bleed air 120 in a first heat exchanger 104 by heating fuel 162. In some examples, cooling input bleed air 74 may include cooling input bleed air 220 in first heat exchanger 204 by heating fuel 262 and further cooling cooled bleed air 222 in third heat exchanger 212 by heating heated, expanded bleed air 250.

The technique illustrated in FIG. 8 also includes extracting work from cooled bleed air 76 with turbine 66 (404). Turbine 66 includes a turbine inlet fluidically coupled to the bleed air outlet of first heat exchanger 64 and a turbine outlet. Turbine 66 may be configured to drive shaft 78 mechanically coupled to turbine 66. In some examples, extracting work from cooled bleed air 76 further cools cooled bleed air 76. In some examples, turbine 66 includes an air starter turbine. The turbine outlet of turbine 66 may be fluidically coupled to second heat exchanger 68 to output expanded bleed air 80 to second heat exchanger 68. In some examples, extracting work from cooled bleed air 76 with turbine 66 may include detecting a temperature, a humidity, or both of expanded bleed air 80 to control the expansion of cooled bleed air 76 through turbine 66 to reduce ice formation downstream of turbine 66. In some examples, extracting work from cooled bleed air 76 with turbine 66 may include extracting work from cooled bleed air 122 with first turbine 106, compressing heated, expanded bleed air 136 with compressor 110, and extracting work from cooled, recompressed bleed air 140 with second turbine 114. In some examples, extracting work from cooled bleed air 76 with turbine 66 may include extracting working from cold bleed air 240 with first turbine 206 and extracting work from heated, expanded bleed air with second turbine 214. In some examples, extracting work from cooled bleed air 122 in first turbine 106 may include driving a shaft mechanically coupled to at least one of a generator, an engine tower-shaft, or a compressor.

The technique illustrated in FIG. 8 also includes extracting heat from at least one heat source 62 with second heat exchanger 68, including an expanded bleed air inlet fluidically coupled to an outlet of the air starter turbine, or another turbine, using expanded bleed air 80 (406). In some examples, the at least one heat source 62 may include an electric machine that is part of a gas turbine engine system. In some examples, extracting heat from at least one heat source 62 may include extracting, by second heat exchanger 68, heat from a cooling fluid of a cooling fluid circuit configured to distribute the cooling fluid to the at least one heat source 62 to extract heat from the at least one heat source 62. In some examples, second heat exchanger 68 may include a condenser, for example, configured to condense a vapor phase of a cooling fluid to a liquid phase of the cooling fluid. In some examples, the at least one heat source 62 may include a plurality of heat sources, and extracting heat from at least one heat source 62 may include extracting, by a respective heat exchanger of a plurality of heat exchangers, heat from a respective cooling fluid of a respective cooling fluid circuit of a plurality of cooling fluid circuits, each respective cooling fluid circuit configured to distribute the respective cooling fluid to the respective heat source to extract heat from the respective heat source. In some examples, another means of extracting heat may include passing cooled expanded air through the aircraft to cool heat loads inside the aircraft, such as, for example, passenger heat loads, environmental heat loads, electrical heat loads, or combinations thereof.

Various examples have been described. These and other examples are within the scope of the following claims.

What is claimed is:

1. A thermal management system, comprising:
a first heat exchanger comprising a bleed air inlet configured to receive input bleed air from a gas turbine engine and a bleed air outlet configured to output cooled bleed air from the first heat exchanger;
an air starter turbine comprising:
a turbine inlet configured to fluidically couple to:
a compressed air source located remote from the thermal management system at a first time, and
the bleed air outlet of the first heat exchanger at a second time, and a turbine outlet,
wherein the air starter turbine is configured to drive a shaft mechanically coupled to the air starter turbine in response to expansion of the cooled bleed air through the air turbine starter, and
wherein the shaft driven by the air starter turbine is mechanically coupled to a high pressure (HP) turbine of the gas turbine engine via an accessory gearbox such that energy from the expansion of the bleed air by the air starter turbine is delivered back to the gas turbine engine; and
a second heat exchanger comprising an expanded bleed air inlet fluidically coupled to the turbine outlet, wherein the second heat exchanger is configured to extract heat from at least one heat source using the expanded bleed air.

2. The thermal management system of claim 1, wherein the at least one heat source comprises at least one of an electric machine, an electrical power distribution system, a power conversion system, power electronics, digital electronics, or an environmental control system.

3. The thermal management system of claim 1, further comprising a cooling fluid circuit, wherein the second heat exchanger is configured to extract heat from a cooling fluid of the cooling fluid circuit, wherein the cooling fluid circuit is configured to distribute the cooling fluid to the heat source to extract heat from the heat source.

4. The thermal management system of claim 3, wherein at least one of the first heat exchanger or the second heat exchanger comprises a condenser.

5. The thermal management system of claim 3, wherein the cooling fluid circuit comprises a first cooling fluid circuit and the cooling fluid comprises a first cooling fluid, the thermal management system further comprising:
a second turbine fluidically coupled to an outlet of the second heat exchanger;
a third heat exchanger fluidically coupled to an outlet of the second turbine; and
wherein the third heat exchanger is configured to extract heat from a second cooling fluid of a second cooling fluid circuit, wherein the second cooling fluid circuit is configured to distribute the second cooling fluid to a second heat source to extract heat from the second heat source.

6. The thermal management system of claim 5, wherein the thermal management system further comprises a cooling fluid manifold, wherein at least one of the second heat exchanger or the third heat exchanger comprises a condenser configured to condense a vapor phase of the respective cooling fluid for delivery to the cooling fluid manifold, and wherein the cooling fluid manifold is configured to distribute the cooling fluid to the first and second heat sources.

7. The thermal management system of claim 5, wherein the first cooling fluid circuit and the second cooling fluid circuit are the same cooling fluid circuit, and wherein the first cooling fluid and the second cooling fluid are the same cooling fluid.

8. The thermal management system of claim 1, wherein the first heat exchanger comprises an air-fuel heat exchanger or an air-to-air heat exchanger.

9. The thermal management system of claim 3, further comprising:
a compressor fluidically coupled to an outlet of the second heat exchanger;
a third heat exchanger fluidically coupled to an outlet of the compressor;
a second turbine fluidically coupled to an outlet of the third heat exchanger;
a fourth heat exchanger fluidically coupled to an outlet of the second turbine; and
wherein the cooling fluid circuit comprises a first cooling fluid circuit, the cooling fluid comprises a first cooling fluid, and the heat source comprises a first heat source, wherein the second heat exchanger is configured to extract heat from the first cooling fluid of the first cooling fluid circuit, wherein the first cooling fluid circuit is configured to distribute the first cooling fluid to the first heat source to extract heat from the first heat source, wherein the fourth heat exchanger is configured to extract heat from a second cooling fluid of a second cooling fluid circuit, wherein the second cooling fluid circuit is configured to distribute the second cooling fluid to a second heat source to extract heat from the second heat source.

10. The thermal management system of claim 9, wherein the first cooling fluid circuit and the second cooling fluid circuit comprise the same cooling fluid circuit, and wherein the first cooling fluid and the second cooling fluid comprise the same cooling fluid.

11. The thermal management system of claim 1, wherein the shaft driven by the air starter turbine is mechanically coupled to the gas turbine engine by an engine tower-shaft.

12. A method of managing a thermal load of a vehicle system comprising,
cooling bleed air from a gas turbine engine with a first heat exchanger comprising a bleed air inlet configured to receive bleed air from the gas turbine engine and a bleed air outlet configured to output cooled bleed air from the first heat exchanger;
extracting work from the cooled bleed air with an air starter turbine comprising a turbine inlet and a turbine outlet,
wherein the air starter turbine is configured to drive a shaft mechanically coupled to the air starter turbine,
wherein extracting work from the cooled bleed air further cools the cooled bleed air,
wherein the turbine inlet is configured to fluidically couple to:
a compressed air source located remote from the vehicle system at a first time, and
the bleed air outlet of the first heat exchanger at a second time, and
wherein the shaft driven by the air starter turbine is mechanically coupled to the gas turbine engine such that energy from the expansion of the bleed air by the air starter turbine is delivered back to the gas turbine engine; and
extracting heat from at least one heat source with a second heat exchanger comprising an expanded bleed air inlet fluidically coupled to the turbine outlet of the air starter turbine using the expanded bleed air.

13. The system of claim 1, further comprising a tower shaft mechanically coupled to the gas turbine engine, wherein the shaft driven by the air starter turbine is loaded against the tower shaft mechanically coupled to the gas turbine engine by the tower shaft such that the energy from the expansion of the bleed air by the air starter turbine is delivered back to the gas turbine engine via the tower shaft.

14. The system of claim 13, further comprising an accessory gearbox, wherein the shaft driven by the air starter turbine is loaded against the tower shaft mechanically coupled to the gas turbine engine by the accessory gearbox.

15. The system of claim 14, wherein the accessory gearbox is mechanically coupled to at least one of a low pressure spool or a high pressure spool of the gas turbine engine.

16. The system of claim 1, wherein the air starter turbine is configured to be operationally coupled to at least one of a low pressure spool or a high pressure spool of the gas turbine engine at normal operating rotational speeds of the at least one of the low pressure spool or the high pressure spool.

17. The system of claim 1, further comprising a controller, the controller configured to control the flow of the input bleed air from the gas turbine engine to the first heat exchanger based on an amount of cooling needed for the heat source.

18. A thermal management system, comprising:
   a first heat exchanger comprising a bleed air inlet configured to receive input bleed air from a gas turbine engine and a bleed air outlet configured to output cooled bleed air from the first heat exchanger;
   an air starter turbine comprising a turbine inlet and a turbine outlet,
      wherein the turbine inlet is configured to fluidically couple to:
         a compressed air source located remote from the thermal management system at a first time, and
         the bleed air outlet of the first heat exchanger at a second time, and
      wherein the air starter turbine is configured to drive a shaft mechanically coupled to the air starter turbine in response to expansion of the cooled bleed air through the air starter turbine;
   a tower shaft;
   an accessory gearbox, wherein the shaft is mechanically coupled to a high pressure turbine of the gas turbine engine by the tower shaft and the accessory gearbox, wherein the shaft driven by the air starter turbine is loaded against the tower shaft such that energy from the expansion of the bleed air by the air starter turbine is delivered back to the gas turbine engine via the tower shaft and accessory gearbox; and
   a second heat exchanger comprising an expanded bleed air inlet fluidically coupled to the turbine outlet, wherein the second heat exchanger is configured to extract heat from at least one heat source using the expanded bleed air.

19. The system of claim 18, wherein the accessory gearbox is mechanically coupled to at least one of a low pressure spool or a high pressure spool of the gas turbine engine.

* * * * *